US012606244B2

(12) United States Patent
    Ogawa

(10) Patent No.: US 12,606,244 B2
(45) Date of Patent: Apr. 21, 2026

(54) DRIVE ASSIST DEVICE

(71) Applicant: TOYOTA JIDOSHA KABUSHIKI KAISHA, Toyota (JP)

(72) Inventor: Toshiro Ogawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 18/973,469

(22) Filed: Dec. 9, 2024

(65) Prior Publication Data

US 2025/0276734 A1    Sep. 4, 2025

(30) Foreign Application Priority Data

Mar. 1, 2024    (JP) ................................ 2024-031429

(51) Int. Cl.
    B62D 15/00    (2006.01)
    B60W 30/12    (2020.01)
    B62D 15/02    (2006.01)

(52) U.S. Cl.
    CPC ........... B62D 15/025 (2013.01); B60W 30/12 (2013.01)

(58) Field of Classification Search
    CPC ....... B62D 15/025; B62D 1/28; B60W 30/12; B60W 30/10
    See application file for complete search history.

(56) References Cited

U.S. PATENT DOCUMENTS

| | | | |
|---|---|---|---|
| 7,692,534 B2 | 4/2010 | Kataoka et al. | |
| 8,352,124 B2 | 1/2013 | Taguchi | |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,714,034 B2 | 7/2017 | Otake et al. | |
| 9,880,558 B2 | 1/2018 | Nakamura | |
| 9,902,399 B2 | 2/2018 | Torii et al. | |
| 10,345,443 B2 | 7/2019 | Masui et al. | |
| 10,611,240 B2 | 4/2020 | Masui et al. | |
| 2020/0207372 A1* | 7/2020 | Akamatsu | B60W 60/0018 |
| 2021/0300364 A1* | 9/2021 | Sadamura | B60W 30/146 |
| 2021/0362720 A1* | 11/2021 | Takahashi | B62D 6/003 |
| 2025/0108788 A1* | 4/2025 | Maeda | B60W 30/025 |

FOREIGN PATENT DOCUMENTS

JP    2010-036757 A    2/2010

* cited by examiner

*Primary Examiner* — Jacob M Amick
(74) *Attorney, Agent, or Firm* — SoraIP, Inc.

(57)    ABSTRACT

The steering angle is controlled according to a steering angle profile. The steering angle profile is composed of a first steering angle profile that causes the vehicle toward the lane departure direction to be directed toward the lane departure avoidance direction, and a second steering angle profile that is continuous with the first steering angle profile, and the rate of change of the steering angle at the initial steering time in the first steering angle profile, the rate of change of the steering angle and the steering angle at the end of steering in the first steering angle profile, the rate of change of the steering angle and the steering angle at the initial steering time in the second steering angle profile, and the rate of change of the steering angle and the steering angle at the end of steering in the second steering angle profile are set to zero.

8 Claims, 7 Drawing Sheets

JERK J $= a_1 + 2a_2t + 3a_3t^2 + 4a_4t^3 + 5a_5t^4 + 6a_6t^5 \cdots$ (1)

LATERAL ACCELERATION G $= a_0 + a_1t + a_2t^2 + a_3t^3 + a_4t^4 + a_5t^5 + a_6t^6 \cdots$ (2)

LATERAL SPEED V $= a_0t + \dfrac{a_1}{2}t^2 + \dfrac{a_2}{3}t^3 + \dfrac{a_3}{4}t^4 + \dfrac{a_4}{5}t^5 + \dfrac{a_5}{6}t^6 + \dfrac{a_6}{7}t^7 + a_7 \cdots$ (3)

HORIZONTAL GRIP Y $= \dfrac{a_0}{2}t^2 + \dfrac{a_1}{6}t^3 + \dfrac{a_2}{12}t^4 + \dfrac{a_3}{20}t^5 + \dfrac{a_4}{30}t^6 + \dfrac{a_5}{42}t^7 + \dfrac{a_6}{56}t^8 + a_7t + a_8 \cdots$ (4)

FIG. 6A

CONTROL TIME MAP

| | | LATERAL SPEED V (m/s) | | | | | | | | | |
|---|---|---|---|---|---|---|---|---|---|---|---|
| | | 0 | | | | | | | | | 2 |
| LATERAL ACCELERATION G (m/s²) | 2 | | | | | | | | | | |
| | | | | | | | | | | | |
| | | | | | | | | | | | |
| | 0 | | | | | | | | | | |
| | | | | | | | | | | | |
| | | | | | | | | | | | |
| | −1 | | | | | | | | | | |

FIG. 6B

MAXIMUM ACCELERATION MAP

| | | LATERAL SPEED V (m/s) | | | | | | | | | |
|---|---|---|---|---|---|---|---|---|---|---|---|
| | | 0 | | | | | | | | | 2 |
| LATERAL ACCELERATION G (m/s²) | 2 | | | | | | | | | | |
| | | | | | | | | | | | |
| | | | | | | | | | | | |
| | 0 | | | | | | | | | | |
| | | | | | | | | | | | |
| | | | | | | | | | | | |
| | −1 | | | | | | | | | | |

FIG. 6C

START POSITION MAP

| | | LATERAL SPEED V (m/s) | | | | | | | | | |
|---|---|---|---|---|---|---|---|---|---|---|---|
| | | 0 | | | | | | | | | 2 |
| LATERAL ACCELERATION G (m/s²) | 2 | | | | | | | | | | |
| | | | | | | | | | | | |
| | | | | | | | | | | | |
| | 0 | | | | | | | | | | |
| | | | | | | | | | | | |
| | −1 | | | | | | | | | | |

DRIVE ASSIST DEVICE

CROSS-REFERENCE TO RELATED APPLICATION

This application claims priority to Japanese Patent Application No. 2024-031429 filed on Mar. 1, 2024, incorporated herein by reference in its entirety.

BACKGROUND

1. Technical Field

The present disclosure relates to a drive assist device.

2. Description of Related Art

There is known a lane departure prevention control device that calculates a target steering angle necessary for avoiding a lane departure of a vehicle, sets, as a first steering force, a steering force necessary for feedback control on the steering angle to the target steering angle, sets, as a second steering force, a steering force for feedforward control on the steering angle based on the target steering angle and a vehicle state quantity, sets a target steering force by changing a ratio between the first steering force and the second steering force according to a traveling state, and applies a steering force to a steering mechanism based on the target steering force (see, for example, Japanese Unexamined Patent Application Publication No. 2010-36757 (JP 2010-36757 A)).

SUMMARY

In general, however, devices including such a known lane departure prevention control device have a problem that, when the lane departure prevention control is performed, a long period is required to, for example, converge the lateral speed of the vehicle to a target lateral speed at the end of the lane departure prevention control.

In order to solve such a problem, a drive assist device according to the present disclosure includes a steering device configured to perform steering assist for a steering angle of a vehicle, sensors configured to detect a lateral position of the vehicle, a lateral speed of the vehicle, and a lateral acceleration of the vehicle, and a processor.

The processor is configured to perform steering assist for controlling the steering angle to follow a steering angle profile indicating a temporal change pattern of a steering angle for avoiding a lane departure.

The steering angle profile includes a first steering angle profile and a second steering angle profile that is continuous with the first steering angle profile and causes a change of the steering angle to a side opposite to the first steering angle profile.

A rate of change of a steering angle at an initial time of steering in the first steering angle profile, a steering angle at an end of the steering in the first steering angle profile and a rate of change of the steering angle, a steering angle at an initial time of steering in the second steering angle profile and a rate of change of the steering angle, and a steering angle at an end of the steering in the second steering angle profile and a rate of change of the steering angle are set to zero.

At the end of the steering assist, the lateral speed of the vehicle can be converged to the target lateral speed in a short period.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6A is a diagram showing a map of control time;

FIG. 6B is a diagram showing a map of maximum lateral acceleration;

FIG. 6C is a diagram showing a map of starting position; and

DETAILED DESCRIPTION OF EMBODIMENTS

Figure 1:
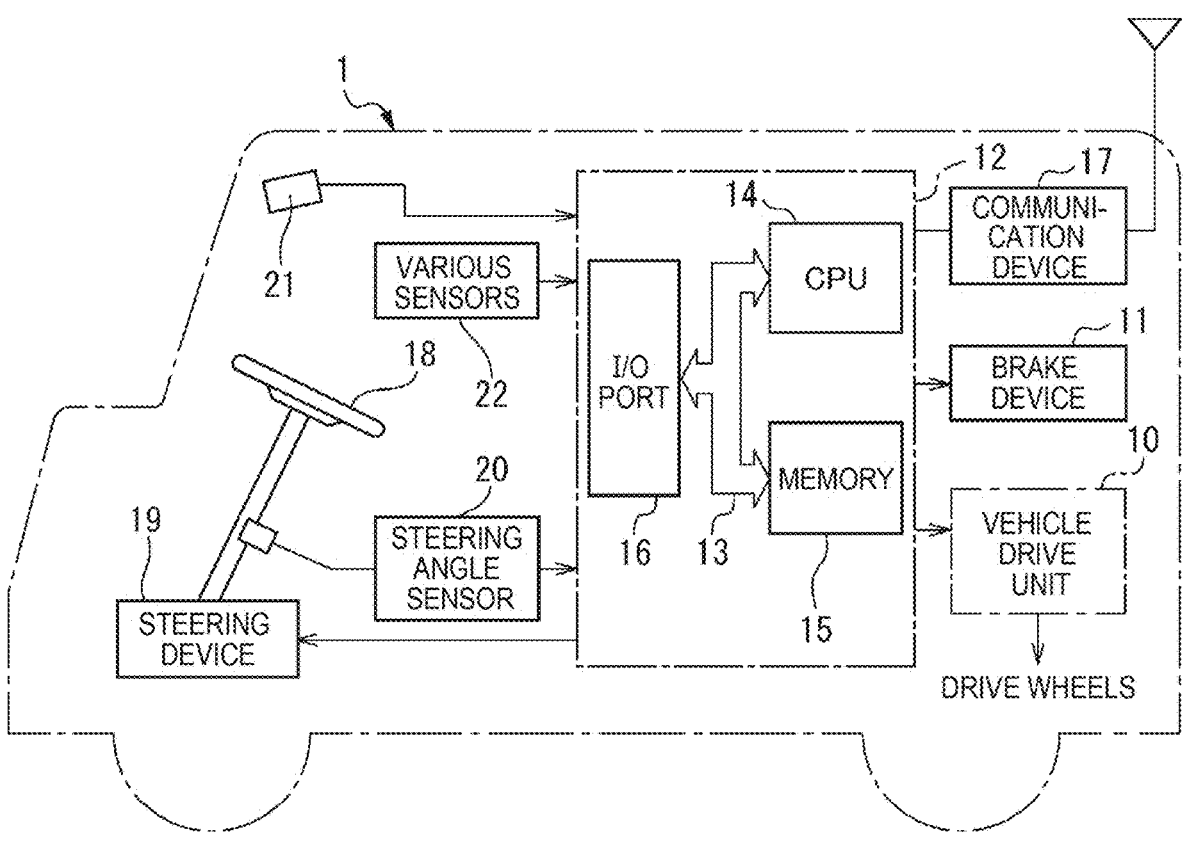
FIG. 1 is a diagram illustrating a functional configuration of a vehicle.

FIG. 1 shows a functional configuration of a vehicle 1. The vehicle 1 is capable of either manual driving or autonomous driving. Referring to FIG. 1, reference numeral 10 denotes a vehicle drive unit for applying a driving force to the driving wheels of the vehicle 1, 11 denotes a braking device for braking the vehicle 1, and 12 denotes an electronic control unit mounted in the vehicle 1. As shown in FIG. 1, the electronic control unit 12 comprises a digital computer and comprises a CPU (processor) 14, a memory 15 including a ROM and a RAM, and an input/output 16 connected to each other by a bi-directional buss 13. A communication device 17 for communicating with the outside is connected to the electronic control unit 12.

On the other hand, the vehicle 1 is provided with a steering device 19 provided with a power steering mechanism for assisting the steering angle operation by the steering wheel 18. The steering device 19 is controlled by an output signal of the electronic control unit 12, and steering angle control is performed in accordance with an output signal of the electronic control unit 12. A steering angle sensor 20 for detecting a steering angle is installed in the vehicle 1, and an output signal of the steering angle sensor 20 is input to the electronic control unit 12. Further, the vehicle 1 is provided with a sensor 21 for detecting a lateral position of the vehicle 1, a lateral speed of the vehicle 1, and a lateral acceleration of the vehicle 1. The output signal of the sensor 21 is input to the electronic control unit 12. In the example shown in FIG. 1, this sensor 21 comprises a front camera capable of detecting a boundary line representing a boundary on both sides of a lane on which the vehicle 1 is traveling. The lateral position of the vehicle 1 from the boundary line, the lateral speed of the vehicle 1, and the lateral speed of the vehicle 1 are calculated based on the captured image data by the front camera 21.

In addition, various sensors 22 such as a sensor for detecting the state of the vehicle 1 and a sensor for detecting the periphery of the vehicle 1 are installed in the vehicle 1. For example, an acceleration sensor, a speed sensor, an azimuth angle sensor, and a geomagnetic sensor are used as sensors for detecting the state of the vehicle 1. As sensors for detecting the surroundings of the vehicle 1, cameras for photographing the side and the rear of the vehicle 1, a LIDAR for detecting the front, the side, and the rear of the vehicle 1, a radar, a clearance sonar, and the like are used. On the other hand, in the example shown in FIG. 1, the vehicle drive unit 10 of the vehicle 1 is constituted by an electric motor driven by a secondary battery or an electric motor driven by a fuel cell. A drive signal of the electric motor is output from the electronic control unit 12, and the drive wheels are driven and controlled by the electric motor in accordance with the drive signal of the electric motor.

Figure 2A:
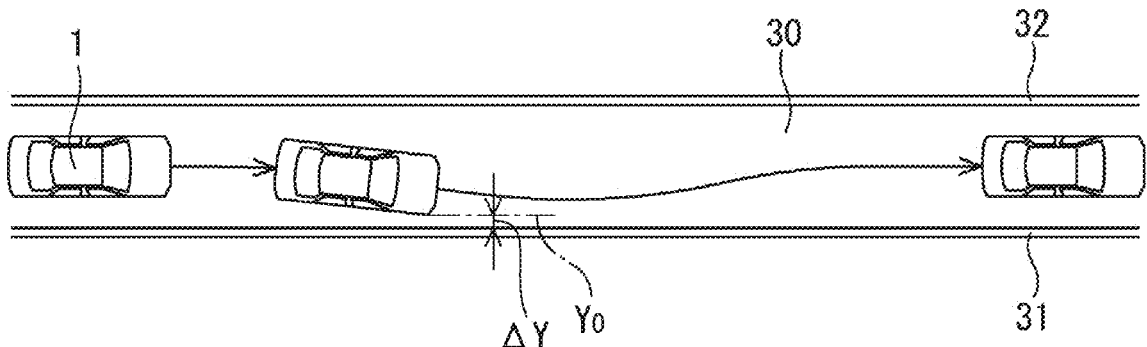
FIG. 2A shows a roadway when viewed from above.
Figure 2B:
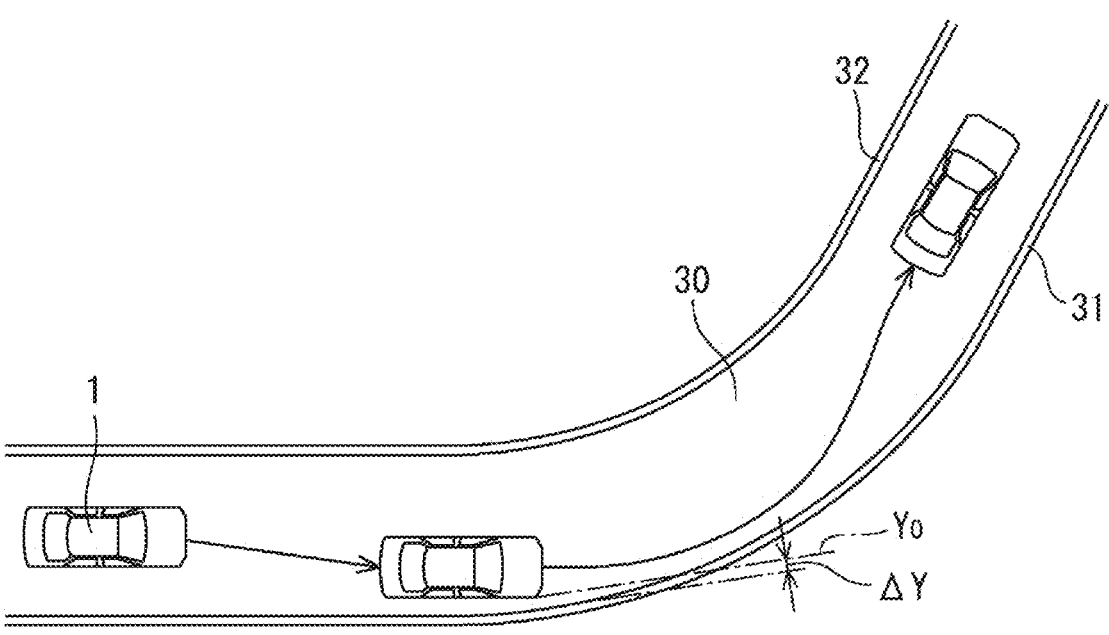
FIG. 2B shows a roadway when viewed from above.

Next, two typical examples of the lane departure avoidance control will be described referring to FIG. 2A and FIG. 2B that schematically show the behavior of the vehicle 1 when the lane departure avoidance control is performed. In FIG. 2A and FIG. 2B, reference numeral 30 denotes a lane when viewed from above. Reference numerals 31 and 32 denote boundary lines representing boundaries on both sides of the lane 30, for example, white lines. The $Y_0$ indicates a deviation determination position that is separated from the edge of the white line 31 on the lane 30 side by a distance $\Delta Y$ toward the lane 30 side. The boundary line includes not only a solid white line but also a broken white line, a yellow line, and the like. Boundary lines include not only lines but also non-solid road edges such as soil and gravel, and solid road edges such as curbs and guardrails. In the lane 30 extending straight, FIG. 2A shows a situation in which the vehicle 1 traveling straight along the center line of the lane 30 at the center of the lane 30 is biased toward the white line 31 and approaching the white line 31 for some reason. In this case, for example, when the outer front end of the vehicle 1 approaches the white line 31 and exceeds the deviation determination position $Y_0$, the lane deviation avoidance control is started, and the vehicle 1 is returned to the center of the lane 30. On the other hand, FIG. 2B shows a situation where the vehicle 1 turning along the center line of the lane 30 in the center of the curved lane 30 bulges outward of the curved portion of the lane 30 and approaches the white line 31. Again, for example, when the outer front end of the vehicle 1 approaches the white line 31 and exceeds the deviation determination position $Y_0$, the lane deviation avoidance control is started, and the vehicle 1 is returned toward the center of the lane 30.

Figure 3:
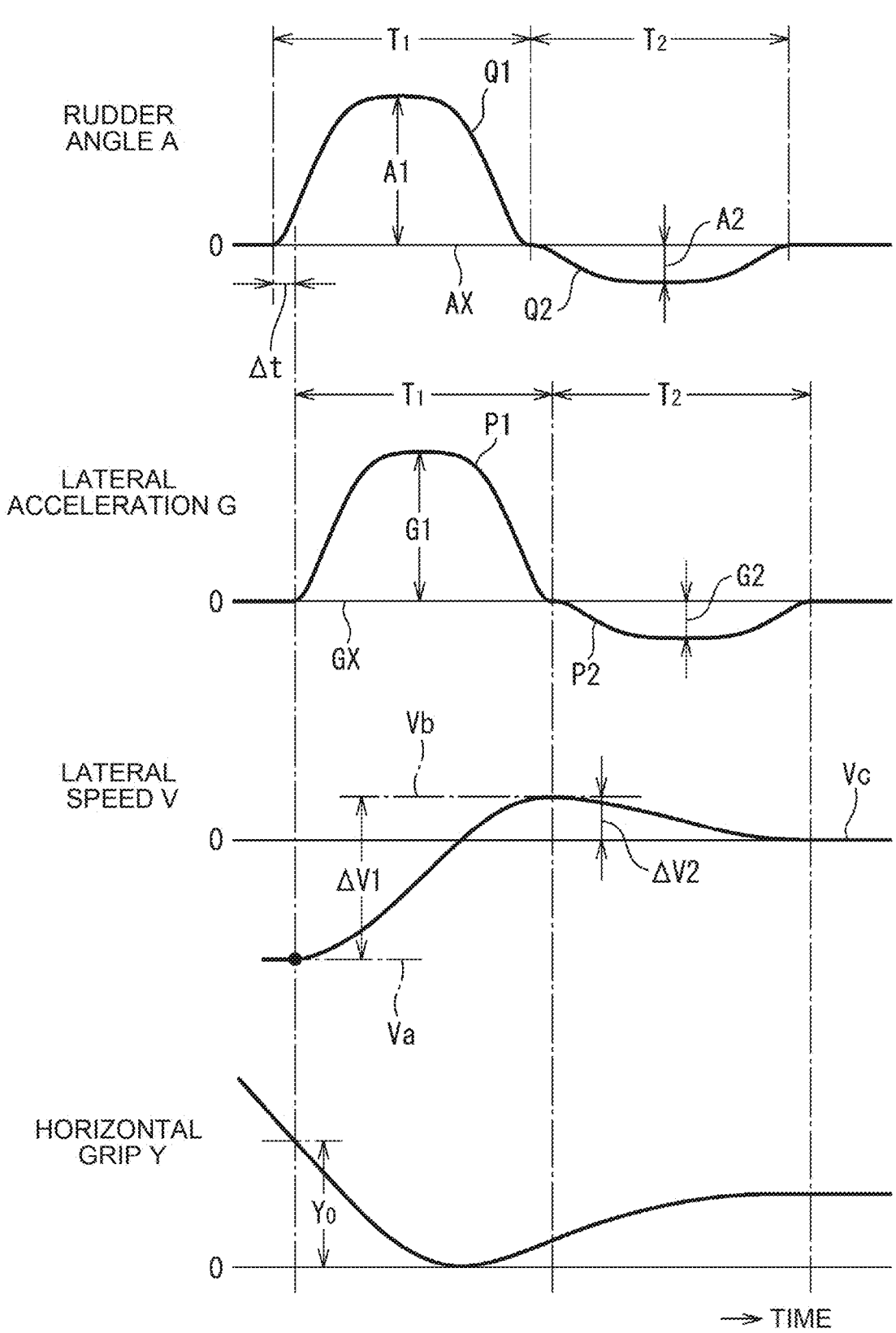
FIG. 3 is a time chart which shows change, such as a steering angle.
Figure 4:
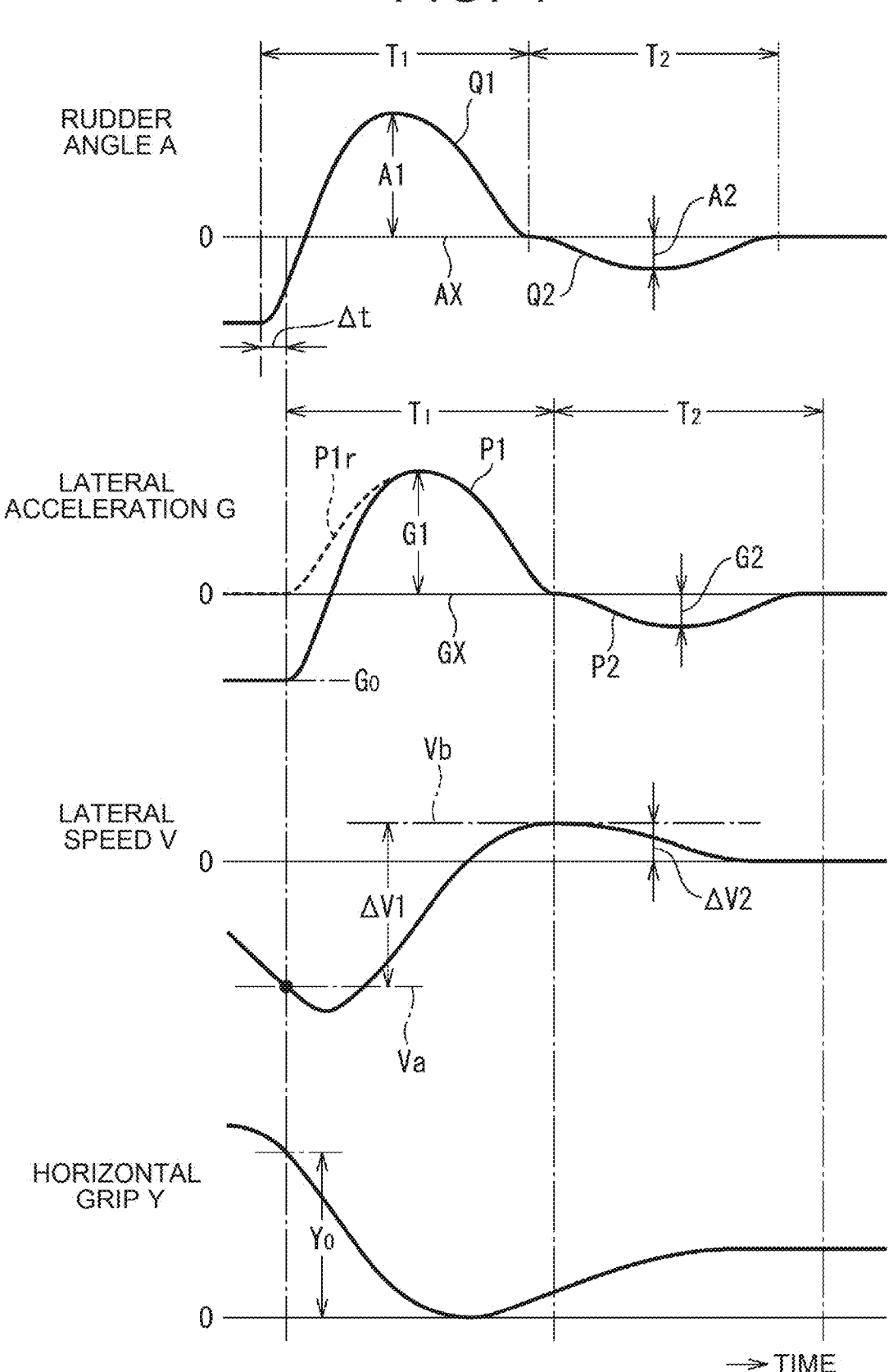
FIG. 4 is a time chart which shows change, such as a steering angle.

FIG. 3 and FIG. 4 show temporal changes in the steering angle A, the lateral acceleration G, the lateral speed V, and the lateral position Y of the vehicle 1 when the lane departure avoidance control according to the present disclosure is performed. The steering angle A represents an angle when the steering angle of the vehicle 1 traveling along the center line of the lane 30 is set as a reference, that is, zero. For example, in the case shown in FIG. 4, when the vehicle 1 is traveling along the curved portion along the centerline of the lane 30, the steering angle is a steering angle $\alpha$ required to turn the vehicle 1. However, in the present disclosure, the steering angle A of the vehicle 1 represents an angle when the steering angle $\alpha$ is set as a reference, that is, zero. In addition, in the present disclosure, the lateral position Y indicates a position outside the front end of the vehicle 1 with reference to an edge of the white line 31 on the lane 30 side. When the lane 30 is curved, the lateral position Y indicates a position on the outer side of the front end of the vehicle 1 with respect to the edge on the side of the lane 30 in a direction perpendicular to the tangent line at the edge on the side of the lane 30 of the white line 31, as shown in FIG. 2B. On the other hand, in the present disclosure, the lateral speed V represents the change speed of the lateral position Y with respect to the edge of the white line 31 on the lane 30 side, and in the present disclosure, the lateral acceleration G represents the change of the lateral speed V per unit time. FIG. 3 shows temporal changes in the steering angle A, the lateral acceleration G, the lateral speed V, and the lateral position Y of the vehicle 1 when the lane departure avoidance control as shown in FIG. 2A is performed. FIG. 4 shows temporal changes in the steering 15 angle A, the lateral acceleration G, the lateral speed V, and the lateral position Y of the vehicle 1 when the lane departure avoidance control as shown in FIG. 2B is performed.

First, an overview of the present disclosure will be described with reference to FIG. 3. When the lateral position Y indicating the outer side of the front end of the vehicle 1 approaches the white line 31 and exceeds the deviation determination position $Y_0$, the lane deviation avoidance control is started. When the lane departure avoidance control is started, a temporal variation pattern of the optimum lateral acceleration G according to the condition of the vehicle 1, that is, a lateral acceleration profile P1, P2 is created in the electronic control unit 12 of the vehicle 1. Based on the lateral acceleration profile P1, P2, a temporal variation pattern of the optimum steering angle A, that is, a steering angle profile Q1, Q2 is created. When the steering angle profile Q1, Q2 is created, the steering angle A is controlled by, for example, PID so that the steering angle A changes following the steering angle profile Q1, Q2.

The steering angle A is a value obtained by integrating a constant determined in accordance with the vehicle 1 with the lateral acceleration G. Therefore, as can be seen from FIG. 3, the steering angle profile Q1, Q2 has a profile in which the height of the lateral acceleration profile P1, P2 from the reference line GX of zero lateral acceleration is enlarged or reduced at the same rate over the entire lateral acceleration profile P1, P2. In addition, since a control delay occurs in the control of the steering angle A, as can be seen from FIG. 3, the lateral acceleration G changes with a time delay of $\Delta t$ with respect to the change of the steering angle A. Note that, as shown in FIG. 2A, when the lane departure avoidance control starts, the temporal rate of change of the lateral acceleration G and the lateral acceleration G is zero, and therefore, the temporal rate of change of the lateral speed V is also zero, as shown in FIG. 3.

At the time of the lane departure avoidance control, the magnitude of the lateral acceleration G and the rate of change of the lateral acceleration G have a large influence on the feeling of the occupant of the vehicle 1 such as the driver. Therefore, the sensation of the occupant of the vehicle 1 depends on the magnitude of the lateral acceleration G and the rate of change of the lateral acceleration G. For example, if the lateral acceleration G at the time of the lane departure avoidance control becomes too large, the passenger of the vehicle 1 is feared, so that the lateral acceleration G at the time of the lane departure avoidance control cannot be extremely increased. Further, even when the rate of change of the lateral acceleration G at the time of the lane departure avoidance control increases, the passenger of the vehicle 1 feels fear, so that the rate of change of the lateral acceleration G at the time of the lane departure avoidance control cannot be increased. In view of the above, an optimum lateral acceleration profile P1, P2 is created so as not to give the passenger of the vehicle 1 a sense of fear.

In addition, when creating an optimum lateral acceleration profile P1, P2 that does not give a feeling of fear to the occupant of the vehicle 1, the following two points are further considered in the present disclosure. That is, the first point is that the lateral acceleration profile P1, P2 can be easily created, and the second point is that the lateral speed V can be converged to zero in a short time when the lane deviation avoidance control ends. The lateral speed V to be converged may be other than zero, and even in this case, the lateral speed V can be converged to the lateral speed V to be converged in a short time.

In order to satisfy these requirements, the lateral acceleration profile P1, P2 is constituted by a first lateral acceleration profile P1 and a second lateral acceleration profile P2 which is contiguous to the first lateral acceleration profile P1, as shown in FIG. 3. The first lateral acceleration profile P1 is created according to the condition of the vehicle 1, and the second lateral acceleration profile P2 is created based on the created first lateral acceleration profile P1. Therefore, in the present disclosure, the steering angle profile Q1, Q2 is also configured by the first steering angle profile Q1 and the second steering angle profile Q2 that is consecutive to the first steering angle profile Q1, as shown in FIG. 3. Here, the first steering angle profile Q1 is formed in a change pattern that changes the steering angle A so as to move the vehicle 1 toward the lane departure direction toward the lane departure avoidance direction. The second steering angle profile Q2 is formed in a change pattern in which the steering angle A is changed in a direction opposite to the first steering angle profile Q1 so that the vehicle 1 in the lane deviation avoiding direction is directed in the lane 30 direction. In FIG. 3, the $T_1$ indicates the control time during which the steering control is performed based on the first steering angle profile Q1, and the $T_2$ indicates the control time during which the steering control is performed based on the second steering angle profile Q2. In the embodiment illustrated in FIG. 3, the control time $T_1$ and the control time $T_2$ are set to the same time.

As described above, the first lateral acceleration profile P1 is first created. Therefore, the first lateral acceleration profile P1 will be described first. The control time $T_1$ indicating the range of the first lateral acceleration profile P1 indicates the same time as the control time $T_1$ during which the steering control is performed based on the first steering angle profile Q1. For this control time $T_1$, there is an empirically optimal control time according to the lateral acceleration G and the lateral speed V. Thus, in the embodiment according to the disclosure, this control time $T_1$ is preset in the form of a control time map as a function of the lateral acceleration G and the lateral speed V, as shown in FIG. 6A. Note that, in FIG. 6A of the drawings, some typical numerical values are shown for the lateral acceleration G and the lateral speed V.

On the other hand, the first lateral acceleration profile P1 is set to the maximum lateral acceleration G1 when $T_1/2$ hours have elapsed after starting the central portion, that is, the lane deviation avoidance control. As for the maximum lateral acceleration G1, an experimentally optimum maximum lateral acceleration G1 corresponding to the lateral acceleration G and the lateral speed V is also present as long as the passenger of the vehicle 1 does not feel a sense of fear. Therefore, in the embodiment according to the disclosure, this maximum lateral acceleration G1 is also preset in the form of a maximum lateral acceleration map as a function of the lateral acceleration G and the lateral speed V, as shown in FIG. 6B. In the first lateral acceleration profile P1, the maximum lateral acceleration G1 is the maximum lateral acceleration map. The rate of change of the lateral acceleration G and the lateral acceleration G at the start of the lane departure avoidance control is zero. The rate of change of the lateral acceleration G in the maximum lateral acceleration G1 is zero. After the lane departure avoidance control is started, the rate of change of the lateral acceleration G and the lateral acceleration G when the control time $T_1$ has elapsed is zero. For example, the target lateral speed Vc at the termination of the lane departure avoidance control is zero. A constant rate of the lateral speed Va at the beginning of the lane departure avoidance control, for example, a speed of ⅓, is created to be the lateral speed Vb when the control time $T_1$ has elapsed.

As can be seen from FIG. 3, in the first steering angle profile Q1, the steering angle A becomes the maximal steering angle A1 at the beginning of steering and at the end of steering in the first steering angle profile Q1. The first steering angle profile Q1 is formed in a change pattern in which the rate of change of the steering angle A and the steering angle A at the beginning of steering in the first steering angle profile Q1 is zero, and the rate of change of the steering angle A and the steering angle A at the end of steering in the first steering angle profile Q1 is zero. In an embodiment of the present disclosure, the first lateral acceleration profile P1 is generated using a sixth order function.

As described above, the rate of change of the lateral acceleration G and the lateral acceleration G at the beginning of the lane departure avoidance control is zero, and the rate of change of the lateral acceleration G in the maximum lateral acceleration G1 is zero. After the lane departure avoidance control is started, the first lateral acceleration profile P1 is created such that the rate of change of the lateral acceleration G and the lateral acceleration G when the control time $T_1$ has elapsed becomes zero. When the lane departure avoidance control is started, the lateral acceleration G gradually increases and smoothly reaches the maximum lateral acceleration G1. The lateral acceleration G then slowly goes to zero while falling smoothly. In addition, the change pattern of the first lateral acceleration profile P1 is a symmetrical pattern between the first half and the second half of the first lateral acceleration profile P1 with respect to the time when the maximum lateral acceleration G1 is reached. As a result, between the time when the lateral acceleration G rises and the time when the lateral acceleration G descends, a feeling of fear is not given to the occupant of the vehicle 1, and it is possible to give a feeling of feeling without a sense of discomfort.

On the other hand, as described above, in the embodiment according to the present disclosure, the first lateral acceleration profile P1 is created by using a sixth order function. In this case, when the first lateral acceleration profile P1 is created, for example, using a fourth order function, the change pattern of the first lateral acceleration profile P1 has a shape sharper upward than that shown in FIG. 3 in the maximum lateral acceleration G1. Therefore, as shown in FIG. 3, the shape is not flat in the vicinity of the maximum lateral acceleration G1. When the first lateral acceleration profile P1 is sharply pointed upward in the maximum lateral acceleration G1 as described above, the lateral acceleration G suddenly changes in the vicinity of the maximum lateral acceleration G1, thereby giving a feeling of fear to the occupant of the vehicle 1. In addition, when the lateral speed V in the lane departure direction is large, the maximum lateral acceleration G1 tends to increase. On the other hand, as shown in FIG. 3, in the change pattern of the first lateral acceleration profile P1, when the vicinity of the maximum lateral acceleration G1 becomes flat, the lateral acceleration G slowly changes in the vicinity of the maximum lateral acceleration G1. Therefore, the passenger of the vehicle 1 is not feared. Therefore, it is of great significance that the first lateral acceleration profile P1 is created using a sixth order function. The first lateral acceleration profile P1 may be created using a sixth order or higher.

On the other hand, as described above, in the present disclosure, the second lateral acceleration profile P2 is created based on the created first lateral acceleration profile P1. Next, how to create the second lateral acceleration profile P2 will be described. In the embodiment illustrated in FIG. 3, the second lateral acceleration profile P2 is a change pattern in which the lateral acceleration G opposite to the first lateral acceleration profile P1 is generated. In other words, the second lateral acceleration profile P2 is a change pattern that is positioned away from the first lateral acceleration profile P1 with respect to the reference line GX of zero lateral acceleration. The second lateral acceleration profile P2 is formed by reducing the height of the first lateral acceleration profile P1 from the reference line GX of zero lateral acceleration by the same ratio over the entire first lateral acceleration profile P1. The reduction ratio is a G2/G1 obtained by dividing the maximum lateral acceleration G2 at the center of the second lateral acceleration profile P2 by the maximum lateral acceleration G1 at the center of the first lateral acceleration profile P1.

Therefore, the second steering angle profile Q2 is also changed to the steering angle A opposite to the first steering angle profile Q1. In other words, the second steering angle profile Q2 is a change pattern that is positioned away from the first steering angle profile Q1 with respect to the reference line AX of the steering angle zero. The second steering angle profile Q2 is formed by reducing the height of the first steering angle profile Q1 from the reference line AX of the steering angle zero by the same ratio over the entire first steering angle profile Q1. Further, as can be seen from FIG. 3, in the first steering angle profile Q1, the steering angle A becomes the maximal steering angle A1 at the beginning of steering and at the end of steering in the first steering angle profile Q1. In the second steering angle profile Q2, the steering angle A becomes the maximal steering angle A2 at the beginning of steering and at the end of steering in the second steering angle profile Q2. The rate of change of the steering angle A and the steering angle A at the beginning of steering in the first steering angle profile Q1 is zero. The rate of change of the steering angle A and the steering angle A at the end of steering in the second steering angle profile Q2 is zero.

In the embodiment according to the present disclosure, the reduction ratio G2/G1 is calculated based on the variation of the lateral speed V. That is, as shown in FIG. 3, the lateral speed Va at the time of starting the lane departure avoidance control, that is, the velocity difference between the lateral speed Va at the initial point of the first lateral acceleration profile P1 and the lateral speed Vb at the time of ending the first lateral acceleration profile P1 is set as $\Delta V1$. The velocity difference between the lateral speed Vb at the initial point of the second lateral acceleration profile P2 and the target lateral speed Vc (=0) at the end of the second lateral acceleration profile P2 is defined as $\Delta V2$. Here, the integral of the lateral acceleration G from the initial point to the end point of the first lateral acceleration profile P1, i.e., the area surrounded by the reference line GX of the first lateral acceleration profile P1 and the lateral acceleration zero, corresponds to the variation of the lateral speed V, i.e., the velocity differential $\Delta V1$, which varies within the control time $T_1$. Further, the integrated value of the lateral acceleration G from the initial point to the end point of the second lateral acceleration profile P2, that is, the area surrounded by the reference line GX of the second lateral acceleration profile P2 and the lateral acceleration zero, corresponds to the variation of the lateral speed V, that is, the velocity difference $\Delta V2$, which changes within the control time $T_2$.

Here, the ratio of the area surrounded by the reference line of the second lateral acceleration profile P2 and the lateral acceleration zero to the area surrounded by the reference line of the first lateral acceleration profile P1 and the lateral acceleration zero represents the reduction ratio G2/G1. Therefore, the ratio $\Delta V2/\Delta V1$ of the change amount of the lateral speed V represents the reduction ratio G2/G1. Therefore, the second lateral acceleration profile P2 is created by reducing the first lateral acceleration profile P1 with the reduction ratio G2/G1, that is, with the reduction ratio $\Delta V2/\Delta V1$. Then, when the second steering angle profile Q2 is created from the created second lateral acceleration profile P2, the lateral speed V decreases from the lateral speed Vb by $\Delta V2$ when the steering angle is controlled by, for example, PID so as to change following the second steering angle profile Q2. Therefore, the lateral speed V changes from the lateral speed Vb to the target lateral speed Vc (=0).

As described above, in the embodiment according to the present disclosure, the velocity difference between the lateral speed Vb of the vehicle at the beginning of steering in the first steering angle profile Q1 and the lateral speed Va of the vehicle at the end of steering in the first steering angle profile Q1 is taken as a V1. Further, the speed difference between the vehicle lateral speed Vb at the beginning of steering in the second steering angle profile Q2 and the target lateral speed Vc (=0) of the vehicle at the end of steering in the second steering angle profile Q2 is defined as $\Delta V2$. In this case, the ratio $\Delta V2/\Delta V1$ of the speed difference $\Delta V2$ to the speed difference $\Delta V1$ is set to the reduction ratio G2/G1. In this case, in the embodiment according to the disclosure, this ratio $\Delta V2/\Delta V1$ is preset. That is, as described above, when the first lateral acceleration profile P1 is created, for example, the target lateral speed Vc at the time of ending the lane departure avoidance control is set to zero. A constant rate of the lateral speed Va at the beginning of the lane departure avoidance control, for example, a velocity of $\frac{1}{3}$, is set as a lateral speed Vb when the control time $T_1$ has elapsed. That is, in the embodiment according to the present disclosure, the relation between the lateral speed Va, the lateral speed Vb, and the target lateral speed Vc is set in advance, and therefore, the ratio $\Delta V2/\Delta V1$ is set in advance.

Thus, in an embodiment according to the present disclosure, a second lateral acceleration profile P2 is created based on the first lateral acceleration profile P1. Therefore, the lateral acceleration profile P1, P2 from the time of starting the lane departure avoidance control to the time of ending the lane departure avoidance control can be easily created. Further, in the present disclosure, the rate of change of the lateral acceleration G and the lateral acceleration G at the end of the first lateral acceleration profile P1, at the beginning of the second lateral acceleration profile P2, and at the end of the second lateral acceleration profile P2 is set to zero. Therefore, at the end of the first lateral acceleration profile P1 and at the beginning of the second lateral acceleration profile P2, the lateral speed V is temporarily maintained in the lateral speed Vb, and at the end of the second lateral acceleration profile P2, the lateral speed V is at least temporarily maintained at the lateral speed Vc, i.e., zero.

In the latter half of the lane deviation avoidance control, when the control for converging the lateral speed V to the target final lateral speed Vb, for example, zero is started in a state in which the lateral acceleration G is generated or in a state in which the lateral speed V is changed, the lateral acceleration G and the lateral speed V at this time usually vary considerably due to a control delay or the like. However, if the lateral acceleration G and the lateral speed V vary at the time of starting the control as described above, it is difficult to converge the lateral acceleration G and the lateral speed V to a target final lateral speed Vb, for example, zero, while adjusting the lateral acceleration G and the lateral speed V. Further, even if the target lateral speed V can be converged to a target final lateral speed Vb, for example, zero, it takes a long time to converge. However, in the present disclosure, at the beginning of the second lateral acceleration profile P2, the rate of change of the lateral acceleration G and the lateral acceleration G is set to zero, and the lateral speed V is held at a constant value in the lateral speed Vb. Therefore, the lateral acceleration G and the lateral speed V are smoothly adjusted. Consequently, the lateral speed V can be converged to the target final lateral speed Vb, e.g., zero, in a short time.

Next, referring to FIG. 4, a method of creating the first lateral acceleration profile P1 and the second lateral acceleration profile P2 when the lane deviation avoidance control as shown in FIG. 2B is performed will be described. In this case, the method of creating the first lateral acceleration profile P1 is substantially the same as that shown in FIG. 3, but the method of creating the second lateral acceleration profile P2 is slightly different from that shown in FIG. 3.

First, how to create the first lateral acceleration profile P1 shown in FIG. 4 will be briefly described. In the case shown in FIG. 4, when the lane departure avoidance control is started, the lateral speed V changes due to the centrifugal force acting on the vehicle 1, and the lateral acceleration G is generated. However, the rate of change of the lateral acceleration G at the start of the lane departure avoidance control is set to zero. Also in the case shown in FIG. 4, similarly to the case shown in FIG. 3, the first lateral acceleration profile P1 is set as the maximum lateral acceleration G1 when $T_1$ or 2 hours have elapsed after the lane departure avoidance control is started. The first lateral acceleration profile P1 is the maximum lateral acceleration map in which the maximum lateral acceleration G1 is shown in FIG. 6B. The first lateral acceleration profile P1 is created such that the lateral acceleration G at the start of the lane deviation avoidance control is $G_0$, the rate of change of the lateral acceleration G is zero, the rate of change of the lateral acceleration G in the maximum lateral acceleration G1 is zero, and after the start of the line deviation avoidance control, the rate of change of the lateral acceleration G and the lateral acceleration G when control time $T_1$ passes is zero, for example, the target lateral speed Vc at the end of lane deviation avoidance control is zero, and for example, a constant rate of the lateral speed Va at the beginning of the lane departure avoidance control, for example, a velocity of ⅓, is set as a lateral speed Vb when the control time $T_1$ has elapsed.

On the other hand, when illustrated in FIG. 4, in order to create the second lateral acceleration profile P2, the first lateral acceleration profile P1r for creating the profile P2 illustrated by a broken line in FIG. 4 is simultaneously created. The first lateral acceleration profile P1r is also set as the maximum lateral acceleration G1 when $T_1$ or 2 hours have elapsed after the lane deviation avoidance control is started. The first lateral acceleration profile P1r is the maximum lateral acceleration map in which the maximum lateral acceleration G1 is shown in FIG. 6B. The first lateral acceleration profile P1r is created such that the rate of change of the lateral acceleration G and the lateral acceleration G at the start of the lane departure avoidance control is zero, the rate of change of the lateral acceleration G at the maximum lateral acceleration G1 is zero, and after the start of the lane departure avoidance control, the rate of change of the lateral acceleration G and the lateral acceleration G when the control time $T_1$ has elapsed is zero, for example, the target lateral speed Vc at the end of the lane departure avoidance control is zero, and for example, a constant rate of the lateral speed Va at the start of the lane departure avoidance control, for example, the rate of ⅓ is the lateral speed Vb when the control time $T_1$ has elapsed.

Also in the embodiment shown in FIG. 4, the second lateral acceleration profile P2 is a change pattern in which the lateral acceleration G opposite to the first lateral acceleration profile P1r is generated, that is, a change pattern located opposite to the first lateral acceleration profile P1r with respect to the reference line GX of the lateral acceleration zero. The second lateral acceleration profile P2 has a profile in which the height of the first lateral acceleration profile P1r from the reference line GX of zero lateral acceleration is reduced at the same rate over the entire first lateral acceleration profile P1. The reduction ratio is a G2/G1 obtained by dividing the maximum lateral acceleration G2 at the center of the second lateral acceleration profile P2 by the maximum lateral acceleration G1 of the first lateral acceleration profile P1r. Therefore, in the embodiment shown in FIG. 4, the second lateral acceleration profile P2 is created by reducing the first lateral acceleration profile P1r with the reduction ratio G2/G1, that is, with the reduction ratio $\Delta V2/\Delta V1$. In this case, although the value of G2/G1 and the value of $\Delta V2/\Delta V1$ do not exactly coincide with each other theoretically, the difference between the values is small, and therefore, there is no significant problem in practical use.

As shown in FIG. 2A and FIG. 2B of the drawings, the lane deviation avoidance control has been described with reference to a case where the vehicle 1 is likely to deviate from the white line 31 on the right side in the traveling direction. However, in the lane deviation avoidance control when the vehicle 1 is likely to deviate from the white line 32 on the left side in the traveling direction, the lane deviation avoidance control is also performed using the lateral acceleration profile P1, P2 and the steering angle profile Q1, Q2 shown in FIGS. 3 and 4. However, in this case, the lateral acceleration G represented by the lateral acceleration profile P1, P2 is opposite to the lateral acceleration G shown in FIGS. 3 and 4, and the steering angle A represented by the steering angle profile Q1, Q2 is opposite to the steering angle A shown in FIGS. 3 and 4. The lateral position Y represents a distance from the white line 32.

Figure 5:
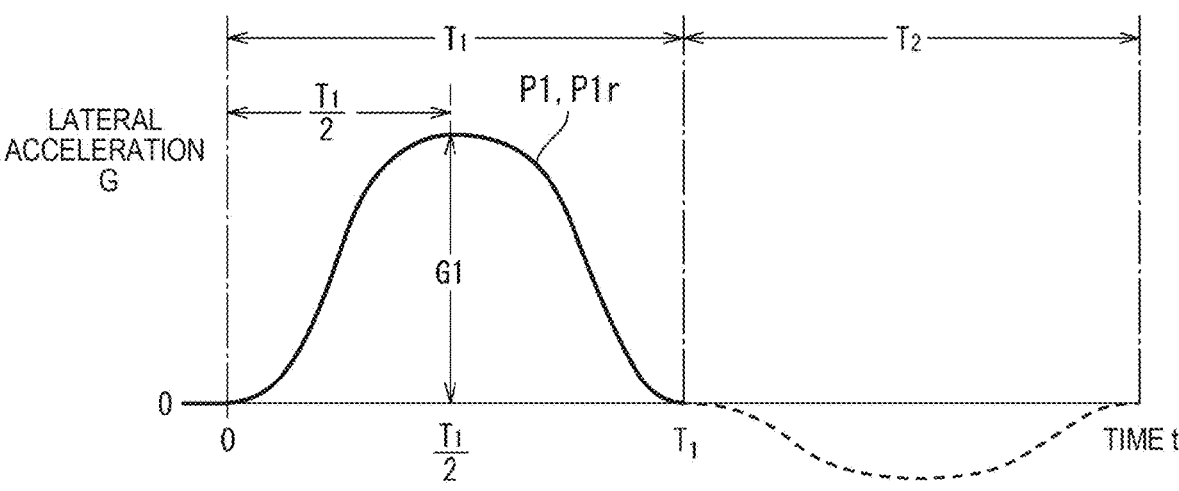
FIG. 5 is a diagram showing a calculation formula.

Next, the first lateral acceleration profile P1 and the first lateral acceleration profile P1r representing the change in the lateral acceleration G will be briefly described. In the embodiment according to the present disclosure, the lateral acceleration G is represented by using a sixth order function as represented by Equation (2) of FIG. 5. In Equation (2) of FIG. 5, t represents the elapsed time since the lane departure avoidance control was started. The jerk J in Equation (1) of FIG. 5 represents the rate of change of the lateral acceleration G, and Equation (1) of FIG. 5 is obtained by differentiating the lateral acceleration G shown in Equation (2) of FIG. 5. On the other hand, Equation (3) in FIG. 5 represents the lateral speed V, and Equation (3) in FIG. 5 is obtained by integrating the lateral acceleration G represented by Equation (2) in FIG. 5. Equation (4) in FIG. 5 represents the lateral position Y, and Equation (4) in FIG. 5 is obtained by integrating the lateral speed V represented by Equation (3) in FIG. 5. Equation (2) of FIG. 5 showing the lateral acceleration G is calculated by applying the boundary condition to Equation (4) of FIG. 5 from Equation (1) of FIG. 5.

When the lateral acceleration G indicating the first lateral acceleration profile P1, P1$r$ in FIG. 5 is calculated, the jerk J is 0 when t=0, so that a$_1$ is 0, and the lateral acceleration G is 0 when t=0, so that a$_0$ is 0. In addition, since the lateral speed V is Va (FIGS. 3 and 4) when t=0, a$_7$=Va is obtained, and since the lateral position Y=deviation determination position Y$_0$ is obtained when t=0, a$_8$=Y$_0$ is obtained. Therefore, the coefficients of the lateral acceleration G that are not determined at this point are only five a$_2$, a$_3$, a$_4$, a$_5$, and a$_6$. Therefore, if five simultaneous equations are established, a$_2$, a$_3$, a$_4$, a$_5$, and a$_6$ are determined.

Next, describing the simultaneous equations, in equation (1) of FIG. 5, when t=T$_1$/2, Jerk J=0 is the first equation. Here, the control time T$_1$ is obtained from the control time map shown in FIG. 6A, which is the same in the following equations: On the other hand, in Equation (2) of FIG. 5, when t=T$_1$/2, the lateral acceleration G=the maximum lateral acceleration G1 is the second equation. The maximum lateral acceleration G1 is then obtained from the maximum lateral acceleration map shown in FIG. 6B. On the other hand, in Equation (1) of FIG. 5, an equation in which the jerk J=0 when t=T$_1$ is defined as the third equation. On the other hand, in Equation (2) of FIG. 5, an equation in which the lateral acceleration G=0 when t=T$_1$ is defined as the fourth equation. Finally, in Equation (3) of FIG. 5, when t=T$_1$, for example, the equation with the lateral speed V=Va/3 is defined as the fifth equation. By solving the simultaneous equations consisting of the fifth equation from these first equation, a$_2$, a$_3$, a$_4$, a$_5$, a$_6$ is determined, the lateral acceleration G, it will be able to calculate using the equation (2) of FIG. 5.

In Equation (4) of FIG. 5, when t=0, the deviation determination position Y$_0$ of the lateral position Y is initially set to any value. Therefore, even if the a$_2$, a$_3$, a$_4$, a$_5$, and a$_6$ are determined, the lowest point of the curve indicating the change in the lateral position Y does not usually become zero as shown in FIGS. 3 and 4. In the embodiment according to the present disclosure, a curve indicating a change in the lateral position Y when the lateral acceleration G and the lateral speed V are variously changed at the time of starting the lane deviation avoidance control is calculated, and a deviation determination position Y$_0$ is obtained from the value when the lowest point of the calculated curve becomes zero. The deviation determination position Y$_0$ is preset in the form of a starting position map as a function of the lateral acceleration G and the lateral speed V, as shown in FIG. 6C. In practice, in some cases, it is preferable to control the steering angle A so that the vehicle 1 toward the lane departure direction passes a little past the white line 31 from the running state of the vehicle 1 at the time of starting the lane departure avoidance control, or from the surrounding conditions such as the movement of other vehicles, or to control the steering angle A so that the vehicle 1 toward the lane departure direction reaches the white line 31, in some cases. In order to control the steering angle A, the deviation determination position Y$_0$ obtained from the starting position map may be shifted toward the white line 31 or toward the center of the lane 30.

Figure 7:
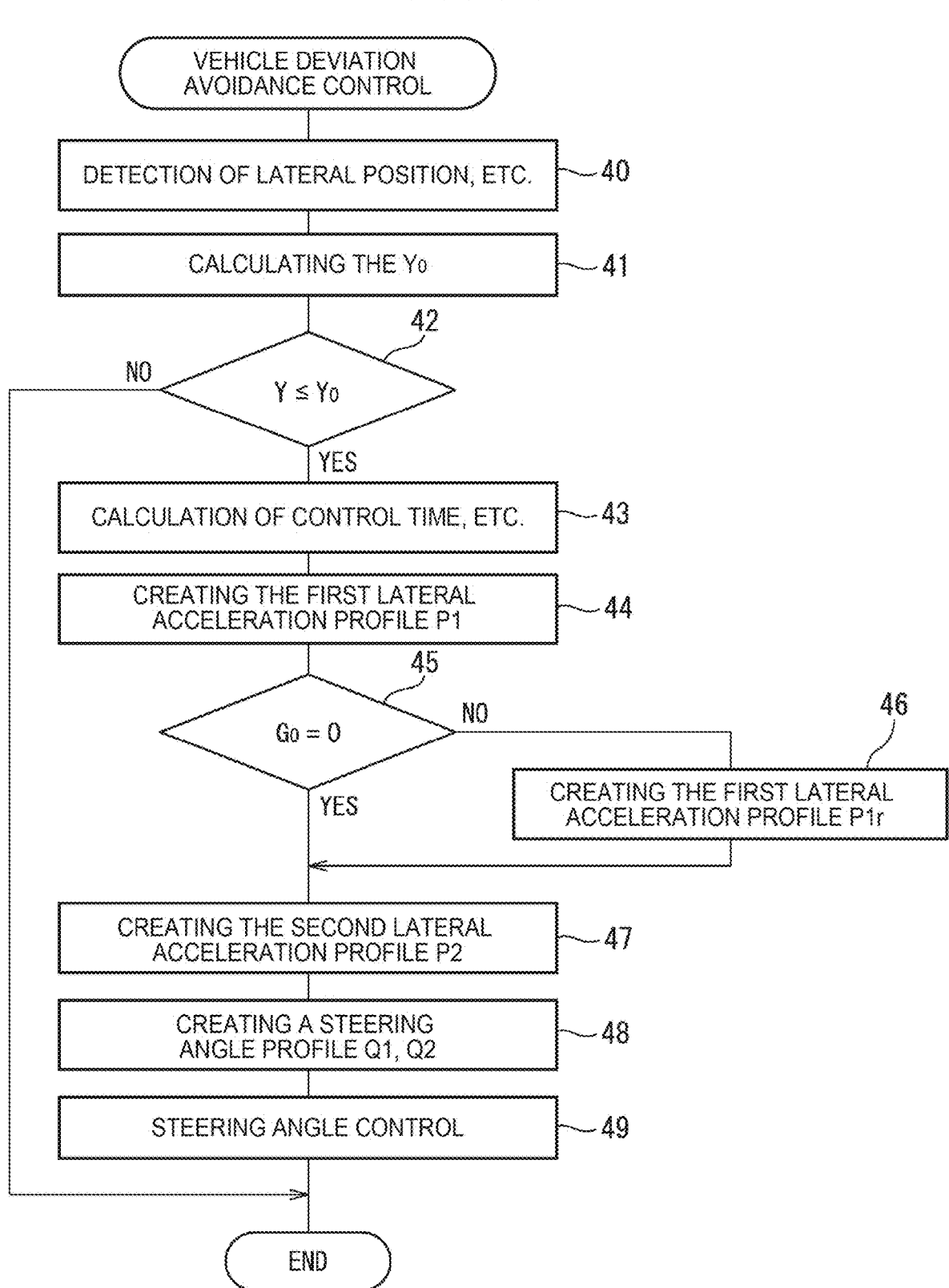
FIG. 7 is a flowchart for executing lane departure avoidance control.

In an embodiment according to the disclosure, the control time map shown in FIG. 6A, the maximum lateral acceleration map shown in FIG. 6B and the starting position map shown in FIG. 6C are stored in the memory 15 of the electronic control unit 12 of the vehicle 1. Further, the five simultaneous equations described above for calculating the lateral acceleration G are stored in the memory 15 of the electronic control unit 12 of the vehicle 1. In the vehicle 1, lane deviation avoidance control is performed using the maps and simultaneous equations stored in the memory 15. FIG. 7 shows a routine executed in the electronic control unit 12 for carrying out the lane departure avoidance control according to the disclosure.

Referring to FIG. 7, first, in step 40, the lateral position Y of the vehicle 1, the lateral speed V of the vehicle 1, and the lateral acceleration G of the vehicle 1 are detected by the sensor 21. Then, in step 41, a deviation determination position Y$_0$ is obtained from the starting position map shown in FIG. 6C based on the detected lateral speed V and lateral acceleration G. Then, in step 42, it is determined whether the detected lateral position Y of the vehicle 1 is likely to deviate from the lane beyond the deviation determination position Y$_0$. When it is determined that the lateral position Y of the vehicle 1 does not exceed the deviation determination position Y$_0$ and does not deviate from the lane, the processing is ended. On the other hand, when it is determined that the lateral position Y of the vehicle 1 is likely to deviate from the lane beyond the deviation determination position Y$_0$, the lane deviation avoidance control is started. Then, proceeding to step 43, the control time T$_1$ is acquired from the control time map shown in FIG. 6A based on the lateral speed V and the lateral acceleration G at the time of starting the lane departure avoidance control. Then, the maximum lateral acceleration G1 is acquired from the maximum lateral acceleration map shown in FIG. 6B.

Next, in step 44, all the coefficients a$_0$, a$_1$, a$_2$, a$_3$, a$_4$, a$_5$, and a$_6$ of Equation (2) of FIG. 5 are calculated based on the lateral speed V and the lateral acceleration G at the time of starting the lane departure avoidance control, and Equation (2) of FIG. 5 representing the lateral acceleration G is obtained. That is, the first lateral acceleration profile P1 is created. Next, in step 45, it is determined whether or not the lateral acceleration G$_0$ at the time of starting the lane departure avoidance control is zero, that is, whether or not it is in the condition shown in FIG. 3. When it is determined that the lateral acceleration G$_0$ at the time of starting the lane departure avoidance control is zero, that is, when it is determined that the lateral acceleration G$_0$ is in the condition shown in FIG. 3, the process proceeds to step 47. Based on the first lateral acceleration profile P1 created in step 44, a second lateral acceleration profile P2 is created.

On the other hand, when it is determined in step 45 that the lateral acceleration G$_0$ at the time of starting the lane departure avoidance control is not zero, that is, when it is determined that the lateral acceleration G$_0$ is in the condition shown in FIG. 4, the process proceeds to step 46. A first lateral acceleration profile P1$r$ is created for creating the profile P2 shown in dashed lines in FIG. 4. Then, proceeding to step 47, a second lateral acceleration profile P2 is created based on the first lateral acceleration profile P1$r$ created in step 46. Then, in step 48, a steering angle profile Q1, Q2 is created from the created first lateral acceleration profile P1 and second lateral acceleration profile P2. Then, in step 49, the steering angle A is PID controlled, for example, so that the steering angle A follows the created steering angle profile Q1, Q2 and changes.

As described above, the steering angle A is a value obtained by integrating a constant determined in accordance with the vehicle 1 with the lateral acceleration G. Thus, as can be seen from FIGS. 3 and 4, the steering angle profile has a profile in which the height of the lateral acceleration profile from the reference line GX of zero lateral acceleration is enlarged or reduced at the same rate over the entire lateral acceleration profile. Therefore, when the lateral acceleration G is zero, the steering angle A also becomes zero, and when the rate of change of the lateral acceleration G is zero, the rate of change of the steering angle A also becomes zero.

When expressed by using the steering angle profile Q1, Q2, the drive assist device according to the present disclosure includes a steering device 19 that assists steering of the steering angle A of the vehicle 1, a sensor 21 capable of detecting the lateral position of the vehicle 1, the lateral speed of the vehicle 1, and the lateral acceleration of the vehicle 1, and a processor 14. The processor 14 performs steering assistance for controlling the steering angle A following the steering angle profile Q1, Q2 indicating a temporal change pattern of the steering angle A for avoiding lane departure. The steering angle profile Q1, Q2 includes a first steering angle profile Q1 and a second steering angle profile Q2 that is continuous with the first steering angle profile Q1 and changes the steering angle away from the first steering angle profile Q1. The rate of change of the steering angle at the initial time of steering in the first steering angle profile Q1, the rate of change of the steering angle and the steering angle at the end of steering in the first steering angle profile Q1, the rate of change of the steering angle and the steering angle at the initial time of steering in the second steering angle profile Q2, and the rate of change of the steering angle and the steering angle at the end of steering in the second steering angle profile Q2 are set to zero.

In the embodiment according to the present disclosure, as can be seen from FIGS. 3 and 4, the second steering angle profile Q2 is a change pattern which is located opposite to the first steering angle profile Q1 with respect to the reference line AX of the steering angle zero, and the second steering angle profile Q2 has a shape in which the height of the first steering angle profile Q1 from the reference line AX of the steering angle zero is reduced at the same ratio over the entire first steering angle profile Q1. Further, as can be seen from FIGS. 3 and 4, the first steering angle profile Q1 is formed in a change pattern that changes the steering angle A so that the vehicle 1 traveling in the lane departure direction is directed in the lane departure avoidance direction. The second steering angle profile Q2 is formed in a change pattern in which the steering angle A is changed in a direction opposite to the first steering angle profile so that the vehicle in the lane deviation avoidance direction is directed in the lane 30 direction.

On the other hand, in the embodiment according to the present disclosure, as can be seen from FIG. 7, a first lateral acceleration profile P1 indicating a temporal variation pattern of the lateral acceleration of the vehicle 1 is created when the lane departure avoidance control is started. A second lateral acceleration profile P2 is created from the first lateral acceleration profile P1. The first steering angle profile Q1 is created from the first lateral acceleration profile P1, and the second steering angle profile Q2 is created from the second lateral acceleration profile P2. As can be seen from Equation (2) of FIG. 5, the variation pattern of the first lateral acceleration profile P1 is represented by a sixth order or more.

Further, as can be seen from FIG. 7, when the lateral acceleration $G_0$ of the vehicle 1 when the lane departure avoidance control is started is zero, the second lateral acceleration profile P2 is created from the first lateral acceleration profile P1 created based on the lateral acceleration $G_0$ of the vehicle 1 when the lane departure avoidance control is started. When the lateral acceleration $G_0$ of the vehicle 1 when the lane departure avoidance control is started is not zero, in addition to the first lateral acceleration profile P1 created based on the lateral acceleration $G_0$ of the vehicle when the lane departure avoidance control is started, another first lateral acceleration profile P1$r$ created assuming that the lateral acceleration $G_0$ of the vehicle when the lane departure avoidance control is started is zero is created. A second lateral acceleration profile P2 is created from the further first lateral acceleration profile P1$r$.

When the lane deviation avoidance control based on the first steering angle profile Q1 is completed, if the lateral speed V increases or decreases due to disturbance such as road surface cant, lateral wind, or vehicle speed change, the reduction ratio $\Delta V2/\Delta V1$ with respect to the second steering angle profile Q2 can be changed. Therefore, it can be said that the control is resistant to disturbance. In FIG. 3 and FIG. 4, the control time $T_2$ may be longer than the control time $T_1$. In this case, the reduction ratio with respect to the second steering angle profile Q2 is obtained by multiplying $\Delta V2/\Delta V1$ by $T_1/T_2$.

What is claimed is:

1. A drive assist device comprising a steering device configured to perform steering assist for a steering angle of a vehicle, sensors configured to detect a lateral position of the vehicle, a lateral speed of the vehicle, and a lateral acceleration of the vehicle, and a processor, wherein:

the processor is configured to perform steering assist for controlling the steering angle to follow a steering angle profile indicating a temporal change pattern of a steering angle for avoiding a lane departure;

the steering angle profile includes a first steering angle profile and a second steering angle profile that is continuous with the first steering angle profile and causes a change of the steering angle to a side opposite to the first steering angle profile; and a rate of change of a steering angle at an initial time of steering in the first steering angle profile, a steering angle at an end of the steering in the first steering angle profile and a rate of change of the steering angle, a steering angle at an initial time of steering in the second steering angle profile and a rate of change of the steering angle, and a steering angle at an end of the steering in the second steering angle profile and a rate of change of the steering angle are set to zero.

2. The drive assist device according to claim 1, wherein:

the first steering angle profile is defined as a change pattern for changing the steering angle to cause the vehicle traveling in a lane departure direction to travel in a lane departure avoidance direction; and the second steering angle profile is defined as a change pattern for changing the steering angle to the side opposite to the first steering angle profile to cause the vehicle traveling in the lane departure avoidance direction to travel in a lane direction.

3. The drive assist device according to claim 1, wherein:

the second steering angle profile is a change pattern located on a side opposite to the first steering angle profile across a reference line indicating a zero steering angle; and the second steering angle profile has a shape in which a height of the first steering angle profile from the reference line indicating the zero steering angle is reduced at the same reduction ratio over an entirety of the first steering angle profile.

4. The drive assist device according to claim 3, wherein the first steering angle profile is defined as a change pattern in which the steering angle is a maximum steering angle at a center between the initial time and the end of the steering in the first steering angle profile.

5. The drive assist device according to claim 3, wherein assuming that $\Delta V1$ is a speed difference between a lateral speed of the vehicle at the initial time of the steering in the first steering angle profile and a lateral speed of the vehicle at the end of the steering in the first steering angle profile, and $\Delta V2$ is a speed difference between a lateral speed of the vehicle at the initial time of the steering in the second steering angle profile and a target lateral speed of the vehicle at the end of the steering in the second steering angle profile, a ratio $\Delta V2/\Delta V1$ of the speed difference $\Delta V2$ to the speed difference $\Delta V1$ is the same reduction ratio, and the ratio $\Delta V2/\Delta V1$ is set in advance.

6. The drive assist device according to claim 1, wherein a first lateral acceleration profile indicating a temporal change pattern of the lateral acceleration of the vehicle is created at a start of lane departure avoidance control, a second lateral acceleration profile is created based on the first lateral acceleration profile, the first steering angle profile is created based on the first lateral acceleration profile, and the second steering angle profile is created based on the second lateral acceleration profile.

7. The drive assist device according to claim 6, wherein the change pattern of the first lateral acceleration profile is represented by a function of a sixth order or higher.

8. The drive assist device according to claim 6, wherein:

when a lateral acceleration of the vehicle at the start of the lane departure avoidance control is zero, the second lateral acceleration profile is created based on the first lateral acceleration profile created based on the lateral acceleration of the vehicle at the start of the lane departure avoidance control;

when the lateral acceleration of the vehicle at the start of the lane departure avoidance control is not zero, another first lateral acceleration profile is created assuming that the lateral acceleration of the vehicle at the start of the lane departure avoidance control is zero, in addition to the first lateral acceleration profile created based on the lateral acceleration of the vehicle at the start of the lane departure avoidance control; and the second lateral acceleration profile is created based on the other first lateral acceleration profile.

* * * * *